UNITED STATES PATENT OFFICE.

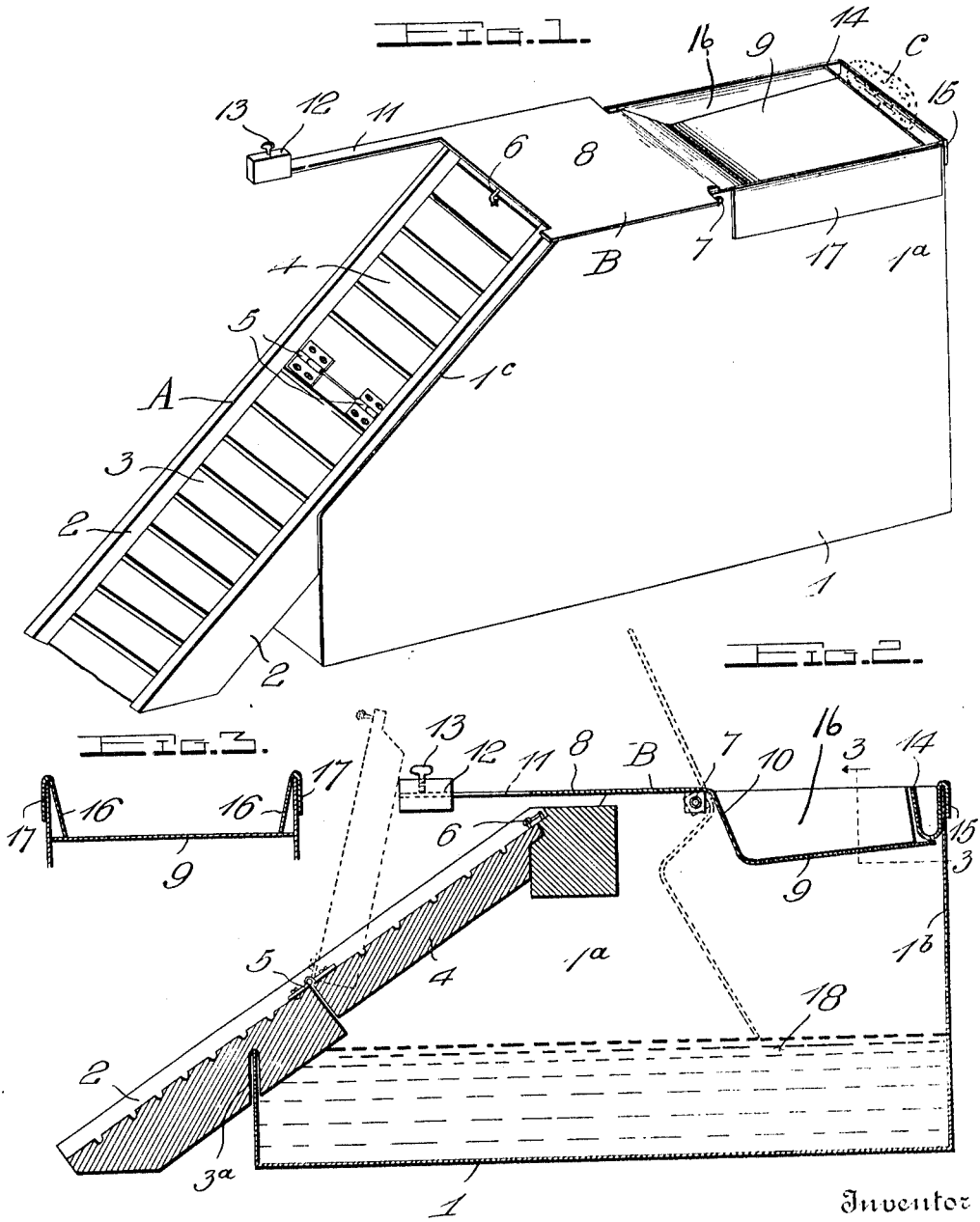

LOUI PEZZOLO, OF SAN JOSE, CALIFORNIA.

RAT-TRAP.

1,096,387.

Specification of Letters Patent.

Patented May 12, 1914.

Application filed August 15, 1913. Serial No. 784,922.

*To all whom it may concern:*

Be it known that I, LOUI PEZZOLO, a subject of the King of Italy, residing at San Jose, in the county of Santa Clara and State of California, have invented certain new and useful Improvements in Rat-Traps, of which the following is a specification.

The present invention relates to certain new and useful improvements in traps such as are adapted to catch rats, rodents, and other small animals, the primary object of the invention being to provide a trap of this character which embodies novel features of construction whereby the trap automatically resets itself after each operation thereof so that a number of the animals can be caught at one time.

A further object of the invention is to provide a trap of this character which is simple and inexpensive in its construction, which is quick and effective in its operation, and which provides for drowning the animals as they are caught, thereby avoiding any odor or disturbances which would prevent other animals from approaching the trap.

With these and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawing, in which:—

Figure 1 is a perspective view of a trap constructed in accordance with the invention. Fig. 2 is a longitudinal sectional view through the same, and Fig. 3 is a transverse sectional view on the line 3—3 of Fig. 2.

Corresponding and like parts are referred to in the following description and indicated in all the views of the drawing by the same reference characters.

Specifically describing the present embodiment of the invention, the numeral 1 designates a tank which is adapted to receive a quantity of water into which the animals are plunged as they are caught. The sides of the tank are extended upwardly at 1ª, and the back is similarly extended upwardly as indicated at 1ᵇ. The upper corners of the extended sides 1ª are cut away as indicated at 1ᶜ on an inclination corresponding to that of the runway A which is arranged at the front end of the trap and leads to the top thereof. This runway A comprises the longitudinal side pieces 2 and a transversely grooved inclined floor 3. The bottom of the runway may be transversely grooved as indicated at 3ª to receive the upper edge of the front of the tank or casing 1. A suitable door 4 is provided in the upper portion of the runway for enabling access to be had to the interior of the trap, the lower end of the door being hinged at 5, while a suitable latch 6 is provided at the upper end of the door for retaining the door in a closed position. This door 4 is normally closed, although it is adapted to be swung outwardly to admit of access being had to the interior of the trap to remove the dead animals therefrom and clean out the same as may become necessary.

A transverse pivot rod 7 connects the extended sides 1ª of the casing or tank 1 at the top thereof and has a tilting platform B pivotally mounted thereon. The end 8 of the tilting platform B projects toward the upper end of the runway A, while the opposite end 9 of the tilting platform is offset downwardly into the top of the casing or reservoir 1, being connected to the end 8 of the said platform by an inclined offset portion 10.

The end 8 of the tilting platform B is provided at one side thereof with a forwardly projecting arm 11 which has a weight 12 adjustably mounted thereon. A set screw 13 is provided for locking the said weight in an adjusted position upon the arm 11, and this weight can be moved in and out upon the arm as may be found desirable, the said weight normally serving to maintain the tilting floor or platform B in a closed position.

A bait trough 14 is applied to the upper edge of the upwardly extended back 1ᵇ of the casing or tank 1, the said bait trough being shown as provided with a flange 15 adapted to be hooked over the upper edge of the casing or tank to retain the bait trough in position. It will also be observed that when the tilting platform or door B is in a closed position, the opposite sides of the end 9 thereof are brought into engagement with inwardly and downwardly inclined stop flanges 16 which are applied to the sides of the casing at the top thereof. These stop flanges 16 are shown as having the upper edges thereof returned at 17 so as to fit over the upper edges of the sides of the casing 1.

When setting the trap, the bait C is placed in the bait trough 14 and the trap located in a place frequented by the rats or other small animals which it may be desired to catch. The animal will readily scent the bait, and the only approach thereto is by means of the runway A. After reaching the top of the runway the animal walks upon the end 8 of the tilting trap door or platform B, the weight of the animal while in this position coöperating with the weight 12 upon the arm 11 to retain the tilting door in a closed position. Before reaching the bait, however, the animal must pass over the intermediate pivot of the tilting door upon the end 9 thereof. It is necessary that the passage of the animal from the end 8 of the tilting door to the end 9 thereof be made quickly, since otherwise the tilting action of the door B might be so slow as to give the animal warning and enable it to avoid being dropped thereby into the interior of the casing or tank 1. It is for this reason that the end 9 of the tilting door is offset from the end 8 thereof and connected to the said end 8 of the door by the steeply inclined offset portion 9. This construction prevents the animal from placing his feet upon the forward end 9 of the tilting door B without causing at least a very appreciable portion of its body to pass upon the other side of the pivot 7. As soon as the weight of the animal is applied to the end 9 of the tilting door, there is a quick swinging action thereof and the animal is thereby dropped downwardly into the tank or reservoir. As indicated by dotted lines upon Fig. 2, the end 8 of the tilting door is swung upwardly at the same time that the end 9 is swung downwardly, so that the retreat of the animal is effectively cut off. The stop flanges 16 are also inclined downwardly so that after the door has once commenced to tilt there is nothing to which the animal can cling to prevent it from being precipitated into the interior of the casing. The bottom of the casing or tank 1 is preferably filled with water, as indicated at 18, so that the animal will be drowned as soon as entering the trap. The action of the weight 12 upon the arm 11 will automatically close the tilting door as soon as the animal has dropped into the tank, thereby automatically resetting the trap after each operation thereof, and enabling a number of animals to be caught at the same time.

Having thus described the invention, what I claim as new and desire to secure by Letters Patent, is:—

1. An animal trap including a casing having an open top, a tilting trap door arranged within the top of the casing and normally closing the same, said trap door being pivotally mounted at an intermediate point between the ends thereof and one end of the trap door being substantially flush with the top of the casing while the opposite end thereof is offset downwardly into the casing and connected to the first mentioned end of the trap door by a steeply inclined portion which necessitates a quick passage of the animal from the first mentioned end of the trap door to the second mentioned end thereof, and counter-balancing means for normally holding the trap door in a closed position.

2. An animal trap including a casing having an open top, a tilting trap door arranged within the top of the casing and normally closing the same, said trap door being pivotally mounted at an intermediate point between the ends thereof and one end of the trap door being substantially flush with the top of the casing while the opposite end thereof is adapted to swing downwardly into the casing and is offset downwardly into the casing, the latter end of the trap door being connected to the first mentioned end of the trap door by a steeply inclined portion so that an animal must pass quickly from the first mentioned end of the trap door to the second mentioned end thereof, and downwardly and inwardly inclined stop flanges applied to the upper edges of the casing for engaging the offset portion of the trap door to limit the swinging movement of the trap door and prevent escape of the animals from the trap.

In testimony whereof I affix my signature in presence of two witnesses.

LOUI PEZZOLO.

Witnesses:
 JOE HARRISON,
 W. W. HEALEY.